United States Patent Office 3,476,691
Patented Nov. 4, 1969

3,476,691
PROCESS FOR PREPARING AN YTTRIA AQUASOL
Jean G. Smith and Frederick T. Fitch, Baltimore, Md.;
may be granted to United States Atomic Energy Commission under provisions of 42 U.S.C. 2182
No Drawing. Filed Sept. 23, 1964, Ser. No. 398,734
Int. Cl. B01j 13/00
U.S. Cl. 252—313                               5 Claims

ABSTRACT OF THE DISCLOSURE

A process for preparing amorphous and crystalline yttrium oxide sols by mixing a substantially electrolyte-free hydrous yttria precipitate with water in a quantity of a strong mineral acid sufficient to adjust the pH to 6.5 to 7.5 followed by heating to form the amorphous yttria sol. The crystalline sol is formed by an additional heating step.

This invention relates to yttria aquasols and to a method for producing these aquasols.

In summary, the process of this invention is a method for preparing an amorphous yttria aquasol comprising the steps of forming an yttria dispersion in water by mixing a substantially electrolyte-free hydrous yttria precipitate with water, adjusting the dispersion pH to from 6.5 to 7.5 with a strong mineral acid, and heating said mixture at a temperature within the range of from 80–150° C. until an amorphous yttria aquasol is obtained. The process of this invention for producing a crystalline yttria sol involves the further step of heating the amorphous yttria aquasol at a temperature within the range from 30 to 100° C. until a crystalline yttria aquasol is formed.

The amorphous yttria composition of this invention consists essentially of an aquasol containing up to about 20 weight percent amorphous yttria particles having a size of from 50 to 350 millimicrons in the longest dimension and the colloidal particles obtained from said aquasol.

The crystalline composition of this invention consists esentially of an aquasol containing up to about 20 weight percent crystalline yttria particles having a size of from 20 to 500 millimicrons in the longest dimension, and to the colloidal particles obtained from said aquasol.

The preferred embodiment of the process of this invention comprises a method for forming an yttria aquasol comprising the steps of mixing an aqueous solution of a soluble yttrium salt, preferably a salt of a monovalent acid, with an alkaline precipitating agent, preferably ammonia, ammonium hydroxide solution, an alkali metal hydroxide, or an amine having a base constant, $K_b$, greater than $1 \times 10^{-8}$, to form a hydrous yttria precipitate; separating the precipitate and washing it substantially free from electrolyte; dispersing the washed yttria precipitate in water and mixing with the water a sufficient amount of a strong acid, preferably hydrochloric acid, to provide a dispersion pH within the range of from 6.5 to 7.5, preferably 6.8 to 7.2, to form a slurry having up to about 10 grams $Y_2O_3$ per 100 milliliters of suspension; and heating the suspension at a temperature from about 80 to 150° C., preferably at about 100° C., until an amorphous aquasol is formed but stopping heating before a crystalline aquasol is formed, the time of heating being preferably for from 0.25 to 6 hours.

In the preferred embodiment of the method for forming the crystalline yttria aquasol, the amorphous aquasol formed as described above is further heated at a temperature of from 30 to 100° C., preferably from 35 to 60° C., until a crystalline yttria aquasol is formed, the time of heating in this step being preferably from about 2 to 16 hours.

The principal use of yttrium oxide or yttria is in nuclear applications. Yttrium oxide has a low neutron cross-section and crystallizes in the cubic system with a unit cell of such dimensions that it can form solid solutions with uranium dioxide. Therefore, yttria is widely used to stabilize the fluorite structure of uranium dioxide against the disrupting influence of oxidation and thus to prevent the loss of fission products.

Yttria also has utility in ceramics. In the colloidal form, yttria is readily mixed with ceramic powders and with sols of ceramic materials to obtain a desired oxide composition. By introducing yttria in sol form, very uniform dispersion can be obtained. After drying of the mixture containing the yttria sol, oxide mixtures containing colloidal yttria particles can be sintered to fine-grained ceramics. The presence of colloidal yttria rather than conventional yttria powders in the ceramic allows the sintering to be obtained at lower temperatures. The colloidal yttria also has a greater particle reactivity.

Yttria sols are also important in metallurgy. Metals and metal alloys can be hardened by incorporating a small amount of colloidal yttria in the metal during processing.

It is one object of this invention to provide a method for producing amorphous and crystalline yttria aquasols.

It is another object of this invention to provide amorphous and crystalline yttria aquasols and the dried powders obtained from said aquasols, which sols and sol particles have an improved utility in nuclear, ceramic, and metallurgical applications.

The yttria aquasols are formed by peptizing hydrous yttrium oxide. The hydrous yttrium oxide is obtained by an alkaline precipitation of a soluble yttrium salt. The yttrium salts employed to make the aqueous solution are preferably salts of a monovalent acid, for example, yttrium chloride and nitrate. The alkaline reagent employed to precipitate the hydrous yttrium oxide can be any conventional soluble alkaline material or soluble material which releases ammonia. Suitable alkaline precipitating agents include ammonia, ammonium hydroxide solution, an alkali metal hydroxide, amines having a base constant, $K_b$, of greater than $1 \times 10^{-8}$, and mixtures thereof. Examples of suitable amines include methyl amine, ethyl amine, hydrazine, etc. The hydrous yttrium oxide is obtained by mixing the yttrium salt solution with the precipitating agent.

The hydrous yttrium oxide precipitate obtained is then separated from the solution and is washed substantially free from electrolytes. The preferred washing method involves a first wash with a dilute ammonia solution followed by a water wash.

The electrolyte-free hydrous yttrium oxide is then dispersed in water, preferably in sufficient water to provide a concentration up to about 10 grams $Y_2O_3$ per 100 milliliters of suspension. The water is mixed with a strong mineral acid, preferably a monovalent acid such as hydrochloride acid or nitric acid. The quantity of acid employed is sufficient to provide a pH within the range of from about 6.5 to 7.5, and preferably from about 6.8 to 7.2.

The acid treated hydrous yttrium oxide suspension is then converted to an amorphous yttria aquasol by heating the slurry at a temperature within the range of from about 80 to 150° C. until the amorphous yttria aquasol is obtained. The hydrous yttria slurry can be heated for a period of about 0.25 to 6 hours. Preferably, the suspension is heated for about 2 hours at a temperature of about 100° C.

The amorphous yttria aquasol is opaque, white, and can contain up to about 20 weight percent $Y_2O_3$. The constituent amorphous particles are predominately cubic or rectangular prisms and range from about 50 to 350 millimicrons in their longest dimension. These particles are actually aggregates of still smaller particles averaging from about 3 to 7 millimicrons in size.

The crystalline yttria aquasol is obtained by hydrothermal treatment of the amorphous yttria aquasol. In this step, the amorphous yttria aquasol is heated at a temperature of from about 30 to 100° C. until the crystalline yttria aquasol is obtained. Heating for a period of from about 2 to 16 hours is satisfactory. Preferably, the amorphous yttria aquasol is heated for 6 to 8 hours at a temperature of from about 35 to 60° C.

The crystalline yttria aquasol particles are plates, ranging from square to diamond shaped and have a length of from 20 to 500 millimicrons. The aggregate structure characteristic of the amorphous yttria particles is not apparent. Whereas the particles of the amorphous yttria were amorphous to electrons, after the hydrothermal treatment, a pronounced electron diffraction pattern for yttrium oxide was evident.

The product amorphous and crystalline yttria aquasols are stable at a pH up to about 7.5 with a preferred pH range of about from 6.8 to 7.2. Below a pH of about 6.8, there is appreciable yttria solubility in water. A sol can be concentrated up to about 20 weight percent $Y_2O_3$ by vacuum evaporation at temperatures up to about 60° C. Alternate methods of concentration of the yttria aquasols can be employed. For example, the aquasols can be centrifuged, and the separated particles can be redispersed in a smaller quantity of water. Yttria powders can be obtained from the amorphous and the crystalline yttria aquasols by means of evaporation to dryness, by centrifuging, or by extraction.

Particles characteristics of the product sols can be determined by electron microscopy through conventional techniques. Crystallite phases can be identified from X-ray diffraction patterns of the dispersed solids after centrifuging. Specific conductance can be measured with a platinized platinum cell having a cell constant of one and an Industrial Instruments conductivity bridge, Model RC16B1. The relative kinematic sol viscosity, $N_k$, is determined by comparing drain time of 10.00 milliliters of sol, $t_s$, with that of 10.00 milliliters of water, $t_w$, in an Ostwald viscometer according to the following equation:

$$N_k = t_s/t_w$$

This invention is further illustrated by the following specific but non-limiting examples.

EXAMPLE 1

A 2175 ml. volume of yttrium chloride solution containing the equivalent of 5 gm. $Y_2O_3$ per 100 ml. of solution was mixed with 325 ml. of a 15 N ammonium hydroxide solution, and a hydrous yttria precipitate was formed. The hydrous yttria was washed free of electrolytes and was then redispersed into water to a final volume of 2400 ml. The pH of the redispersed hydrous yttria precipitate was adjusted to 6.8 with 155 ml. of 2 N hydrochloric acid. The acid treated yttria suspension was heated for 2 hours under reflux at 100° C., and a white, opaque yttria aquasol was formed.

Electron microscopy showed that the product sol consisted of cubes and rectangular prisms ranging up to 330 millimicrons in their longest dimension. The average particle size was 200 millimicrons. These particles were, in turn, aggregates of smaller particles which ranged in size from 3 to 7 millimicrons. The sol was amorphous to electrons. Other properties of the amorphous yttria aquasol were as follows:

pH _____ 6.9
Specific conductance, mho/cm. _____ $5.65 \times 10^{-3}$
Density, gm./cc. _____ 1.038
Concentration, wt. percent $Y_2O_3$ _____ 4.92
Relative kinematic viscosity _____ 1.41

EXAMPLE 2

This example described the preparation of a more concentrated, crystalline yttria aquasol.

A 1250 ml. quantity of yttrium chloride solution containing the equivalent of 20 grams $Y_2O_3$ per 100 ml. was precipitated with 625 ml. of a 15 N ammonium hydroxide solution. The resulting hydrous yttria precipitate was washed with 3 N ammonia solution until a negative test for chloride ions was obtained. Then it was washed free of ammonia with water, filtered, and slurried with water to a volume of 2800 ml. The pH of the dispersion was adjusted to 7.1 with 300 ml. of 3 N hydrochloric acid. The acid treated dispersion was refluxed at atmospheric pressure for 2 hours, and an opaque white yttria aquasol containing 8 grams $Y_2O_3$ per 100 ml. of suspension was obtained. The pH of the aquasol was 7.0 and its specific conductance was $2.71 \times 10^{-3}$ mho/cm.

The amorphous aquasol was then hydrothermally converted to the crystalline form by heating at 35° C. for 16 hours. Simultaneous concentration of the aquasol was obtained by evaporation by maintaining the aquasol under vacuum during the above heating step. An electron micrograph of the product sol after concentration showed predominately smooth plates ranging from square to diamond shaped and having a size in the range of from about 50 to 250 millimicrons. An electron diffraction pattern was obtained consisting of spotty lines, showing the crystalline nature of the sol particles. Other properties of the crystalline yttria aquasol were as follows:

pH _____ 6.8
Specific conductance, mho/cm. _____ $2.25 \times 10^{-2}$
Density, gm./cc. _____ 1.144
Concentration, $Y_2O_3$ wt. percent _____ 15.6
Relative kinematic viscosity _____ 1.75

Obviously many modifications and variations of the invention as hereinabove set forth may be made without departing from the essence and scope thereof, and only such limitations should be applied, as are indicated in the appended claims.

We claim:
1. A process for preparing a yttria aquasol comprising the steps of:
   (a) forming a hydrous yttria dispersion in water by mixing a substantially electrolyte-free yttria precipitate, water and a quantity of strong mineral acid sufficient to provide a mixture pH within the range of from 6.5 to 7.5, and
   (b) heating the said slurry at a temperature within the range of from 80 to 150° C. for a period of about 0.25 to 6 hours.
2. The process of claim 1 wherein the acid is added in a quantity sufficient to provide a pH within the range of from 6.8 to 7.2.
3. The process of claim 1 wherein the acid is hydrochloric acid.
4. A process for preparing a yttria aquasol comprising in the steps of:
   (a) mixing an aqueous solution of a yttrium salt with an alkaline precipitating agent to form a hydrous yttria precipitate,
   (b) separating the precipitate and washing it free of electrolyte,
   (c) mixing the washed yttrium precipitate with water and a sufficient quantity of hydrochloric acid to provide a pH within the range of 6.5 to 7.5, and
   (d) heating the mixture to a temperature of 80 to 150° C. for a period of about 0.25 to 6 hours to form an amorphous yttria aquasol.
5. A process for preparing a yttria aquasol comprising the steps of:
   (a) mixing an aqueous solution of a yttrium salt with an alkaline precipitating agent to form a hydrous yttria precipitate,

(b) separating the precipitate and washing it free of electrolyte,
(c) mixing the washed yttria precipitate with water and a sufficient quantity of hydrochloric acid to provide a pH within the range of 6.8 to 7.2,
(d) heating the mixture at a temperature of about 80 to 150° C. for a period of about 0.25 to 6 hours to form an amorphous yttria aquasol, and
(e) heating the amorphous aquasol at a temperature of about 30 to 60° C. for about 2 to 16 hours to form the crystalline yttria aquasol.

References Cited

Weiser: "Inorganic Colloid Chemistry," vol. II, John Wiley and Sons, Inc., New York (1935), pp. 285–286.

LEON D. ROSDOL, Primary Examiner

RICHARD D. LOVERING, Assistant Examiner

U.S. Cl. X.R.

23—19; 106—65